United States Patent [19]

Benson

[11] 4,012,930
[45] Mar. 22, 1977

[54] LOCKS

[76] Inventor: Everett H. Benson, Rte. 1 Box 429, Eagle Creek, Oreg. 97022

[22] Filed: Oct. 24, 1975

[21] Appl. No.: 625,511

[52] U.S. Cl. ................................. 70/234; 70/49; 70/168; 70/370

[51] Int. Cl.² ..................... E05B 71/00; B62H 5/00

[58] Field of Search ............ 70/15, 18, 19, 49, 58, 70/168, 233, 234, 235, 370, 371; 248/226 D, 230; 211/5

[56] References Cited

UNITED STATES PATENTS

| 527,418 | 10/1894 | Free | 70/15 |
|---|---|---|---|
| 584,614 | 6/1897 | White | 248/230 |
| 1,181,687 | 5/1916 | Seiss | 248/230 |
| 1,968,506 | 7/1934 | Schneider | 70/168 X |
| 1,986,203 | 1/1935 | Ivandick | 70/168 |
| 2,005,535 | 6/1935 | Duarte | 70/371 X |
| 2,180,117 | 11/1939 | Lipsis | 70/234 X |
| 3,636,741 | 1/1972 | Enne et al. | 70/371 X |
| 3,738,134 | 6/1973 | Hall | 70/370 X |
| 3,781,861 | 12/1973 | Aduer et al. | 70/233 X |
| 3,808,847 | 5/1974 | Vesely | 70/18 |
| 3,903,719 | 9/1975 | Katz | 70/234 X |
| 3,910,081 | 10/1975 | Pender | 70/58 X |

FOREIGN PATENTS OR APPLICATIONS

| 802,885 | 6/1936 | France | 70/234 |
| 883,305 | 3/1943 | France | 70/58 |
| 132,445 | 7/1901 | Germany | 70/233 |
| 436,840 | 11/1926 | Germany | 70/234 |

*Primary Examiner*—Roy D. Frazier
*Assistant Examiner*—Thomas J. Holko
*Attorney, Agent, or Firm*—Klarquist, Sparkman, Campbell, Leigh, Hall & Whinston

[57] ABSTRACT

A lock device comprises a cylindrical container securable by split clamps to the frame of a device, and is adapted to store a case-hardened chain. The container has "pass-and-catch" notches at one end for receiving penultimate links of the chain, when the chain is used to lock a device. The container is closed by a lockable cap, which closes the upper ends of the notches to anchor the chain ends. The entire accessible portion of the structure, including the clamps, the container, the cap, and the chain, is of case-hardened steel. The clamps are secured to the container by tamper proof fastening elements. A preferred embodiment includes a container and a lockable cap having splining tongs formed from the rim portion thereof, and has clamps secured to a bicycle post by tamper proof bolts. The rim of the container is bent over at opposite sides to form keeper portions under which ends of a lock-controlled latching bar may be moved.

4 Claims, 13 Drawing Figures

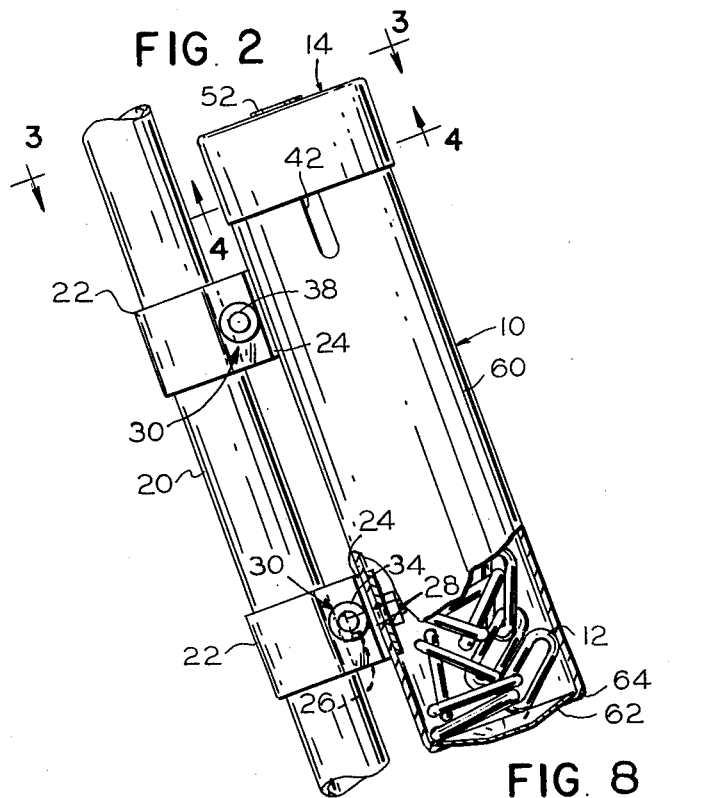
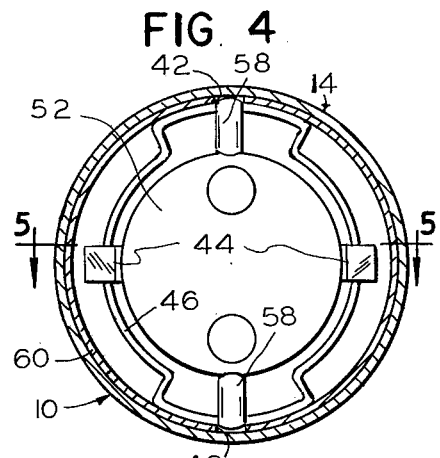
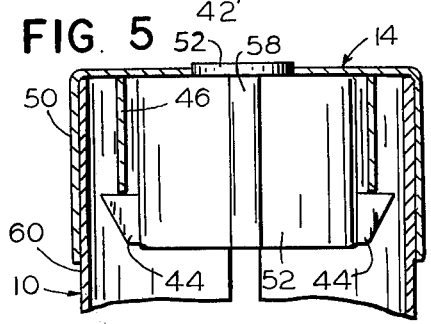
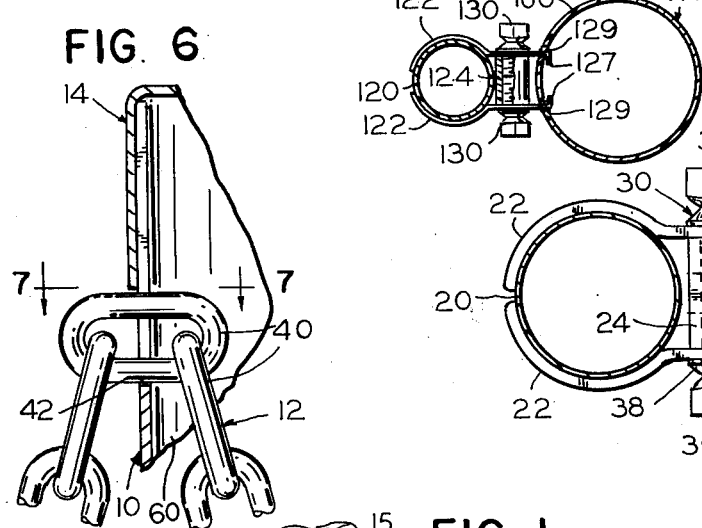
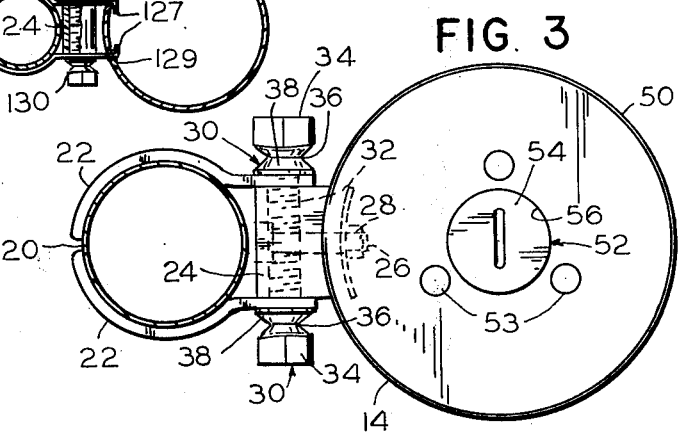
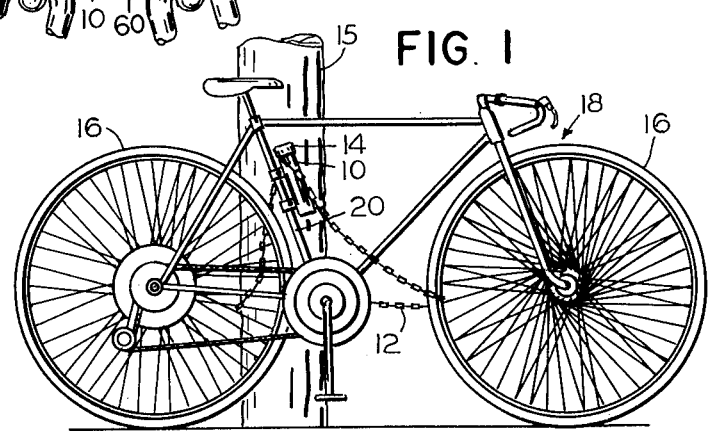
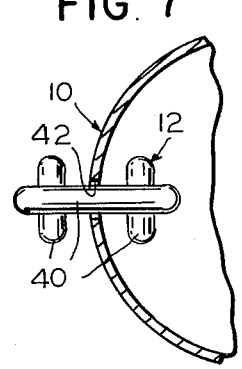

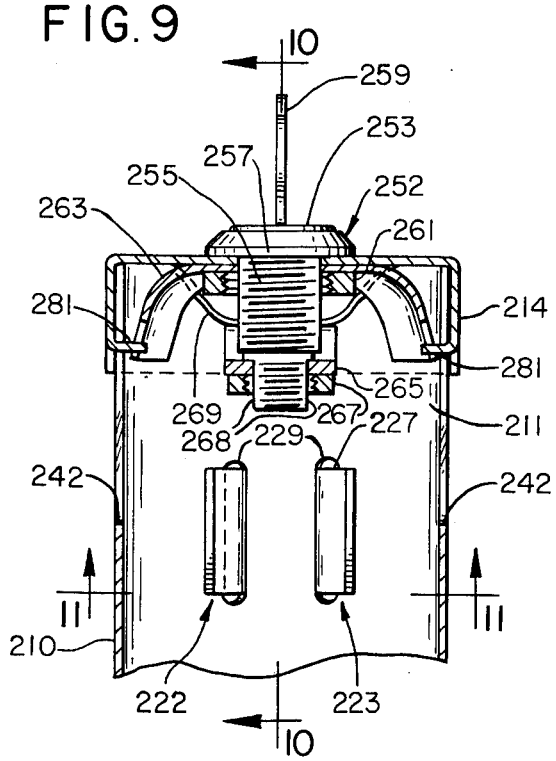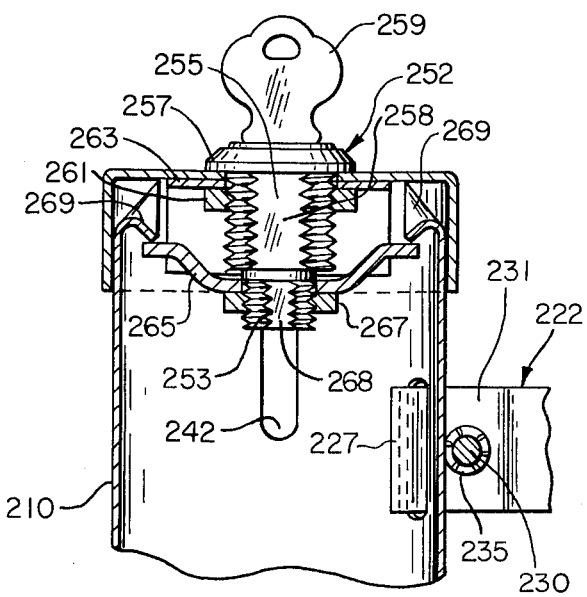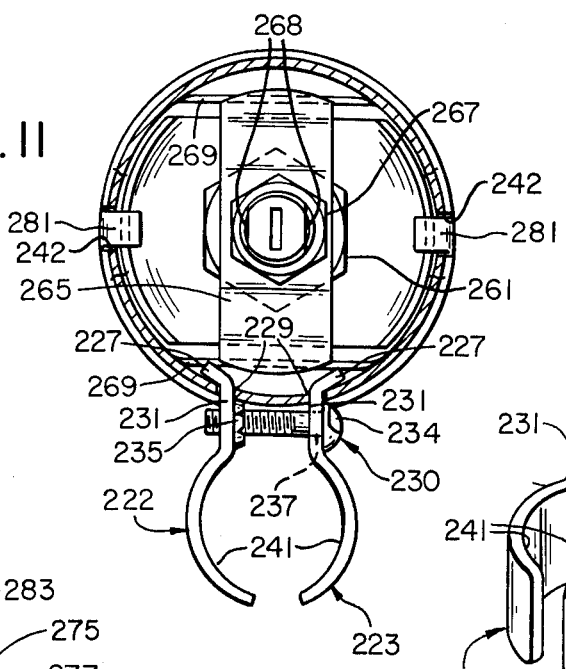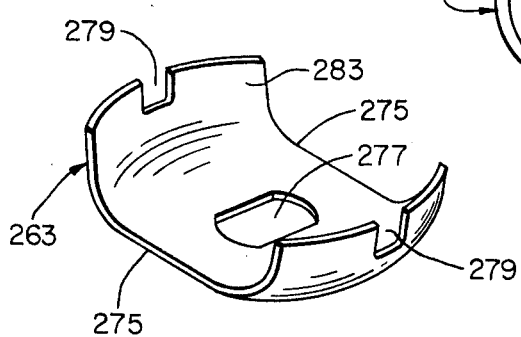

LOCKS

DESCRIPTION

This invention relates to improved locks, and has for an object thereof the provision of improved locks.

Another object of the invention is to provide locks for devices such as, for instance, bicycles, which are virtually tamper proof by ordinary thievery tools.

A further object of the invention is to provide locks wherein storage containers for chains function to lock the ends of th chains, when the chains are locking devices to be secured.

Another object of the invention is to provide locks for devices, such as bicycles, which include case-hardened clamps securing case-hardened containers to frame posts of devices such as bicycles, and including locking caps on the containers adapted to lock end portions of case-hardened chains in "pass-and-catch" notches in the containers.

Another object of the invention is to provide tamper proof locks wherein storage containers for chains lock the ends of the chains to lock items to be secured and which are of a construction requiring virtually no machining and almost entirely of die made components with no die cast parts. In the drawings:

FIG. 1 is a side elevation view of a bicycle chained to a post by a lock forming one embodiment of the invention;

FIG. 2 is an enlarged, fragmentary, partially sectional view of the lock of FIG. 1 with the chain stored in the chain container;

FIG. 3 is an enlarged cross-sectional view taken along line 3—3 of FIG. 2;

FIG. 4 is an enlarged, cross-sectional view taken along line 4—4 of FIG. 2;

FIG. 5 is an enlarged, fragmentary, mid-sectional view of the lock of FIG. 1 with the inner portion shown in elevation and taken along line 5—5 of FIG. 4;

FIG. 6 is an enlarged, fragmentary, mid-sectional view of the lock of FIG. 1, showing the chain in anchored condition;

FIG. 7 is an enlarged, fragmentary sectional view taken along line 7—7 of FIG. 6;

FIG. 8 is a sectional view of an improved lock forming an alternate embodiment of the invention;

FIG. 9 is a fragmentary, vertical sectional view of an improved lock forming a preferred embodiment of the invention;

FIG. 10 is a fragmentary, vertical sectional view taken along line 10—10 of FIG. 9;

FIG. 11 is a horizontal sectional view taken along line 11—11 of FIG. 9;

FIG. 12 is a perspective view of a cup of the lock of FIG. 9; and,

FIG. 13 is an enlarged, perspective view of the clamps of FIG. 9.

Referring now in detail to the drawings, there is shown in FIGS. 1-7 an improved lock forming one embodiment of the invention, and including a case-hardened steel container 10 (FIG. 2) which serves as a storage compartment for a case-hardened steel locking chain 12. A locking cap or cover 14 of case-hardened steel closely fits and locks onto the upper end of the container. When the chain is stored in the container, as in FIG. 2, the cap and container function as a locked container unit for the chain. When the chain is in use, as in FIG. 1, the cap and container serve as an anchor for the chain ends, in a manner to be presently described.

The container is mounted on a post 20 of the frame of the bicycle (FIG. 1) by strong, case-hardened steel clamps 22 (FIG. 2) rigidly and unremovably secured to blocks 24 by means to be presently described. The blocks are secured to the container by Allen head screws 26 (FIG. 3) screwed into nuts 28 welded to the inner wall of the container. The post 15 covers the heads of the screws 26 so that they are inaccessible.

The pairs of clamps are secured to the blocks by snapoff headscrews 30 (FIG. 3) screwed into tapped bores 32 in the blocks. The screws 30 have wrench drivable heads 34 connected by weakened portions 36 to undrivable heads 38 and, after the screws are fully screwed into the tapped bores, further turning of the heads 34 snaps off the heads 34 so the screws cannot be backed out.

The upper end portion of the container has slots or notches 42 (FIGS. 2 and 6) which form "pass-and-catch" notches about which more will be presently said.

The locking cap 14 comprises a case-hardened steel cup which is secured to the container 10 by spring-pressed latches 44 (FIGS. 4 and 5) which fit under keeper bars 46. The latter have Z-shaped end portions welded to the container to space arcuate body portions of the keeper bars inwardly from the adjacent walls of the container in position for engagement by the latches 44. When the cap is locked in place, its skirt 50 closely embraces the adjacent end of the container 10.

A key operable lock assembly 52 (FIG. 3) is riveted by helix rivets 53 to the under side of the cap, with a key-operable cylinder 54 extending into a hole 56 in the cap. The cylinder has an externally accessible slot for a key.

Splining lugs 58 (FIGS. 4 and 5) on the cap fit between the ends of the Z-shaped bars 46 to spline the cap to the container and prevent the cap from turning relative to the container.

When the cap is in its closed position, there is little space between the lower ends of the skirt 50 of the cap and links 40 (FIG. 6) of the chain passing through the slots. Also, the cap, closely fitting the slotted upper end of the container, prevents prying off of the cap.

The container 10 includes a cylinder 60 closed at its lower end by a belled disc 62 (FIG. 2) fitted into lower end portion of the cylinder and retained therein by a rolled flange 64. The belled disc is flattened somewhat after insertion to form a press fit in the cylinder. The disc has a small drain hole in its bottom.

To lock the bicycle 18, the locking cap 14 is removed from the container 10 by unlocking the cap with a key (not shown) to withdraw the spring-pressed latches or bolts 44 (FIG. 5). The chain 12 is pulled out of the container and is wrapped around the post 15 (FIG. 1) and/or strung through the wheels 16. Then, any of the links 40 of the chain 12 inward from the end links of the chain are placed edgewise into the slots 42 (FIG. 6). The slots form "pass-and-catch" notches and prevent endwise passage of the next links of the chain. The cap 14 then is pushed onto the container 10 and the spring-pressed latches 44 (FIG. 5) snap under the keeper bars 46 to hold the cap rigidly in a position blocking removal of the chain. To unlock the bicycle, the cap is unlocked, and the chain removed and placed in the container.

Embodiment of FIG. 8

An improved lock forming an alternate embodiment of the invention is like that of FIGS. 1 to 7 except for clamps 122, which have bent over hook-like end portions 127 inserted through slots 129 in container 110. The clamps 122 are locked to a bicycle post 120 by capscrews 130 having snapoff heads and screwed into the ends of a nut 124 to clamp the clamps tightly against the post 120 and against the adjacent edges of the slots 129. The slots 129 are of a width sufficient relative to the thickness of the clamps to permit sufficient pivoting of the clamps relative to the container to insert one of the clamps 127 into the container and onto the post after the other clamp has been inserted into its slot and placed on the post.

Preferably, the nut 124 can be eliminated. Instead, holes are punched in the clamps in a manner to provide small circular flanges which are threaded to receive the screws 130.

Embodiment of FIGS. 9-12

An improved lock forming a preferred embodiment of the invention is similar to the lock of FIGS. 1 to 7 except for upper and lower pairs of clamps 222 and 223 and bolts 230 and the construction of a cap 214, a lock 252 and upper end portion 211 of a container 210. The bolts 230 have one-way driving heads 234 and are screwed into inwardly punched and internally threaded portions 235. The theaded portions of the bolts pass freely through unthreaded holes 237 in the clamps 222. Bent over, hook-like end portions 227 are at about 45° relative to shank portions 231 and are insertable through slots 229 in the container 210. The portions 235 function as stops to limit movement of the shank portions 231 inwardly through the slots. The clamps 222 and 223 have opposed, arcuate gripping portions 241.

The lock 252 is commercially available and includes a key operable cylinder 253 rotatable in a housing 255 having a flange 257 and oppositely disposed keying flats 258. The lock is operable by a removable key 259. A nut 261 is screwed onto the housing 255, which is theaded. A strong, rigid cup 263 is clamped by the nut against the cap. A strong, rigid, locking bar 265 is locked rigidly on the cylinder 253 by a nut 267, and is keyed to the cylinder by flats 268.

The cylinder may be turned by the key to an unlocking position in which the locking bar is completely out from under strong rigid keeper portions 269. The keeper portions are formed by bending inwardly and downwardly rim portions of the container 210. The cylinder also may be turned to a locking position in which the end portions of the bar 265 are directly under the keeper portions.

Splining tabs 281 are cut from and bent inwardly from the rim portion of the cap 214 and are adapted to move along slots 242 in the container. The slots 242 are adapted to receive links of the chain (not shown) like the slots 42 (FIG. 2).

The cup 263 has oppositely disposed cut-out portions 275, a keying hole 277 and slots 279 in rim portions 283 for receiving the splining tabs 281. The cup strengthens the cap 214 and the edges of the cup 263 are spaced inwardly from the cap to permit the cap to slide down over the upper end portion of the container. The cup is keyed to the housing 255 and also is keyed to the cap by the tabs 281 to precisely position and hold the lock relative to the cap.

The containers may be made in different sizes for different sizes and lengths of the chains.

What is claimed is:

1. In an improved lock,
    a chain having links of a predetermined width and a predetermined thickness,
    a tubular container open at one end and having a pair of slots extending from said end a predetermined distance and of a width sufficient to permit the links to be moved edgewise thereinto and sufficiently narrow to prevent the links adjacent to links in the slots from moving through the slots,
    a cap adapted to fit over the open end portion of the container to close the open ends of the slots to trap the links in the slots,
    means on one end of said tubular cylinder providing keeper means and at least one circumferentially displaced groove,
    lock means on the cap having a locking member turnable on operation of said lock means from a position in alignment with said keeper means to lock the cap to the container, to a position in alignment with said groove to release said cap,
    said cap having stop means projecting into at least one of said slots to preclude turning of the cap relative to the container, and
    an anchoring member non-rotatably engaging said lock means and said stop means to preclude rotation of said lock means relative to said tubular container,
    the container serving to receive the chain and store it when the chain is not used for securing purposes.

2. The improved lock of claim 1 wherein said stop means comprises a pair of tabs on said cap fitting in said slots, said anchoring member comprising a cross member formed with notches to receive said tabs.

3. The lock of claim 2 wherein said keeper means comprises a pair of inwardly bent portions of said tubular container.

4. In an improved lock
    a chain having links of a predetermined width and a predetermined thickness,
    a tubular container open at one end and having a pair of slots extending from said end a predetermined distance and of a width sufficient to permit the links to be moved edgewise thereinto and sufficiently narrow to prevent the links adjacent to links in the slots from moving through the slots,
    a cap adapted to fit over the open end portion of the container to close the open ends of the slots to trap the links in the slots,
    keeper means mounted in the container,
    and lock means on the cap for engaging the keeper means to releasably lock the cap to the container,
    the container serving to receive the chain and store it when the chain is not used for securing purposes,
    said slots being 180° apart, the keeper means including a pair of striker plates having Z-shaped end portions fastened to the container at opposite sides of the slots and arcuate striker portions extending between the end portions, and the lock means including a pair of spring pressed lugs adapted to snap under the striker portions and also including a pair of splining lugs positioned between the end portions of the striker plates.

* * * * *